United States Patent [19]
Jimison

[11] Patent Number: 6,049,938
[45] Date of Patent: Apr. 18, 2000

[54] METHOD AND APPARATUS FOR CLEANING AND POLISHING FRUITS AND VEGETABLES

[76] Inventor: James W. Jimison, 360 Fulton St., Palo Alto, Calif. 94301

[21] Appl. No.: 08/825,491

[22] Filed: Mar. 28, 1997

Related U.S. Application Data

[63] Continuation-in-part of application No. 29/037,144, Apr. 5, 1995, Pat. No. Des. 383,576, and application No. 29/037,145, Apr. 5, 1995, Pat. No. Des. 381,145, which is a continuation-in-part of application No. 08/080,660, Jun. 18, 1993, abandoned.

[51] Int. Cl.$^7$ .......................... B65D 33/16; B65D 33/04; B65D 30/08
[52] U.S. Cl. .......................... 15/210.1; 15/3.1; 15/209.1; 383/63; 383/106; 383/109
[58] Field of Search .................. 15/21.2, 3.1, 209.1, 15/210.1; 383/35, 63, 106, 109

[56] References Cited

U.S. PATENT DOCUMENTS

| | | | |
|---|---|---|---|
| 2,080,402 | 5/1937 | Herman | 383/35 |
| 2,530,746 | 11/1950 | Wetherby | 15/210.1 |
| 2,674,289 | 4/1954 | Silverman | 383/109 |
| 3,312,337 | 4/1967 | Martin | 383/106 |
| 3,495,764 | 2/1970 | Crane | 383/106 |
| 3,826,926 | 7/1974 | Morris | 383/109 |
| 4,321,756 | 3/1982 | Mosely . | |
| 4,756,422 | 7/1988 | Kristen | 383/109 |
| 4,971,454 | 11/1990 | Branson | 383/109 |
| 5,035,517 | 7/1991 | Edelman | 383/63 |
| 5,603,995 | 2/1997 | Takubo | 383/109 |
| 5,711,609 | 1/1998 | Simonsen | 383/63 |

FOREIGN PATENT DOCUMENTS

| | | | |
|---|---|---|---|
| 469025 | 10/1950 | Canada | 383/106 |
| 933002 | 9/1973 | Canada | 383/109 |
| 1441107 | 4/1966 | France | 383/106 |
| 97451 | 2/1961 | Norway | 383/63 |

*Primary Examiner*—Randall E. Chin
*Attorney, Agent, or Firm*—Carol D. Titus; James J. Leary

[57] ABSTRACT

A method and apparatus for cleaning and polishing products, including fruits and vegetables, in which the product is placed in a specially constructed cleaning bag and oscillated. The rolling motion of the product cleans and polishes the surfaces of the product. The bag has a lining especially selected for the purpose and is designed for occasional replacement of the lining or temporary removal for cleaning purposes. In one embodiment, the bag features an elastic section that accommodates various sizes of loads.

19 Claims, 7 Drawing Sheets

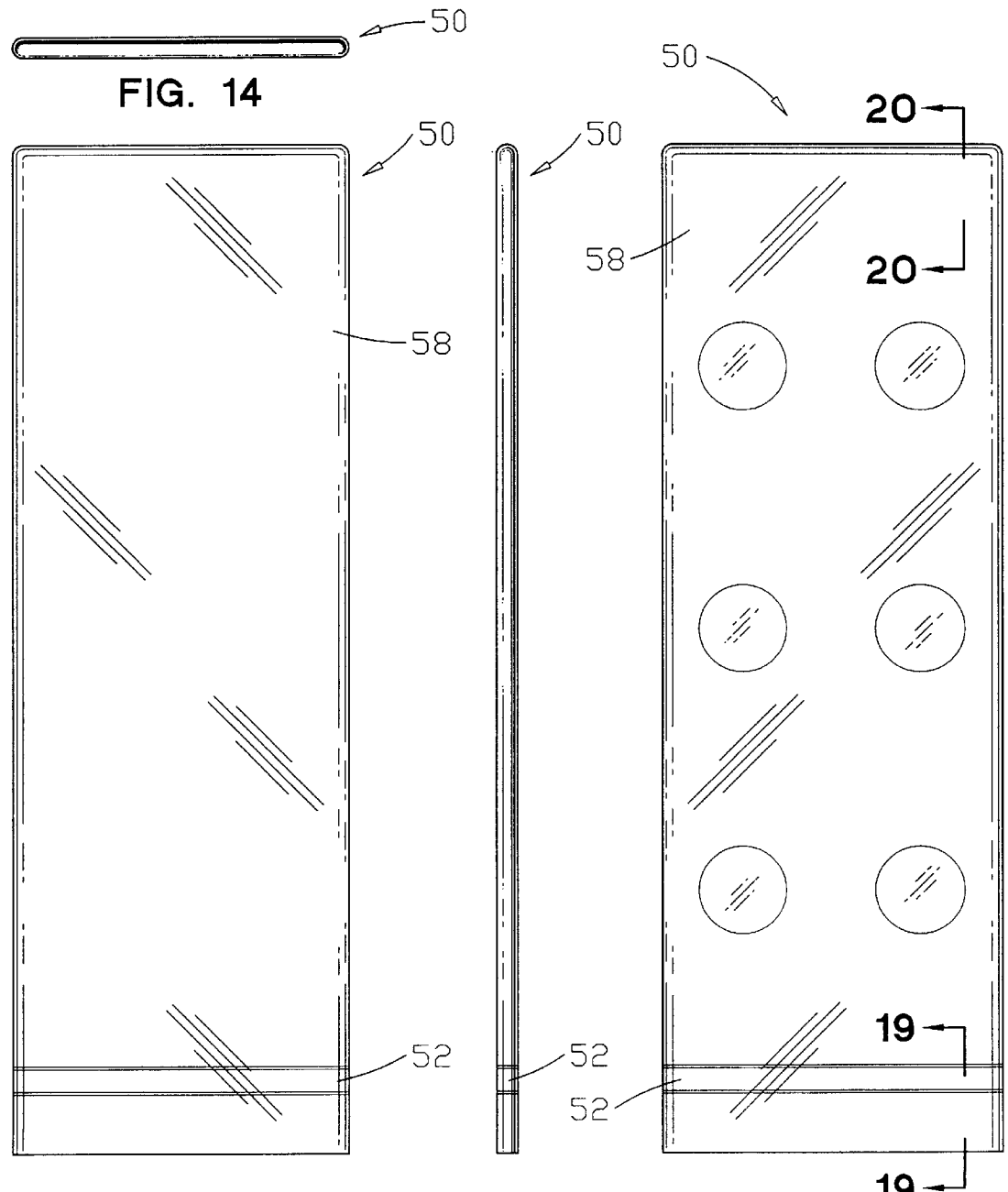

METHOD AND APPARATUS FOR CLEANING AND POLISHING FRUITS AND VEGETABLES

CROSS-REFERENCE TO OTHER APPLICATIONS

This application is a continuation-in-part of application Ser. No. 29/037,144, filed Apr. 5, 1995, now U.S. Pat. No. D383,576, issued Sep. 9, 1997 and application Ser. No. 29/037,145, filed Apr. 5, 1995, now U.S. Pat. No. D381,145, issued Jul. 15, 1997, both of which are continuations-in-part of application Ser. No. 08/080,660, filed Jun. 18, 1993, abandoned.

FIELD OF THE INVENTION

This invention relates to devices for cleaning and polishing fruits, vegetables or other products. More particularly, it relates to a specially constructed cleaning bag into which the products are placed and shaken, in an end-to-end oscillatory motion, to clean and polish them.

BACKGROUND OF THE INVENTION

The marketing and culinary appeal of most all fruits and vegetable depends on their appearance. Therefore extensive technology has been disclosed for washing and preparing product for the marketplace.

U.S. Pat. No. 4,990,351 to Orman et al discloses a method involving simultaneously scrubbing the product with brushes while drenching the product with a falling liquid containing an aqueous fungicide with a controlled pH. The process is performed in order to clean the fruit while simultaneously depositing a fungicidal coating on the surface of the product.

U.S. Pat. No. 4,204,291 to Chooljian et al is for an apparatus to remove mold and other detritus from raisins in which the raisins are subject to a shower and an oscillatory agitation on a conveying system in which the raisins are conveyed in one direction on a conveyor belt which is textured to carry the debris in the opposite direction.

The foregoing disclosures are examples of operations that are performed on products on a commercial scale. Operations of this type do not satisfy the interests of the homemaker because, in many instances, fungicides or thin coatings are deliberately left on the product in order to preserve the product during its transport through the market place to the household. Consequently, homemakers spend considerable effort in washing products in order to render the products safer for consumption by their families. A number of devices have appeared in the market to facilitate this practice.

U.S. Pat. No. 4,321,756 to Mosely discloses a drying apparatus consisting of a net bag placed inside an outer imperforate plastic film bag. The product to be dried is placed inside the net bag. The two bags containing product are held together and manually rotated or swung so that water is slung off of the product by centrifugal force and collected in the outer imperforate bag. The inner bag may be a net material or, alternatively, an absorbing material such as terry cloth.

U.S. Pat. No. 4,944,051 to Porter discloses a net bag with rings for attachment to a faucet such that the bag with product to be washed can be suspended from the faucet with water running over the product while the user manually manipulates the contents of the bag to ensure thorough washing.

Appearance is a function not only of the cleanliness of the product but also the degree of polish that has been developed on the surface of the product. Discolored products resulting from application of chemicals is not completely removed by simply washing the product such as is often done by the homemaker. Remnants of these chemical not only leave the product in an unattractive condition, but also pose a health problem. Many homemakers are well aware of the health problems associated with ingesting a product that has not been completely cleaned and tend to equate appearance of the product with exposure to health problems.

SUMMARY OF THE INVENTION

It is an object of this invention to provide a method and apparatus for cleaning and polishing fruits and vegetables. The method is particularly directed toward small fruits and vegetables that are eaten whole or with the skin or peel intact. Examples of such vegetables and fruits are tomatoes, radishes, apples, grapes, cherries, kumquats, etc. The inventor also recognizes that such a method and apparatus would also be useful for other non-food products, for instance golf balls, stones or marbles, therefore the items to be cleaned will be referred to generically as "products" which should be understood to include food and non-food items. It is another object of this invention to generate a polished and otherwise attractive appearance of the product. It is another object that the practices of this invention be convenient to the homemaker in the typical home environment. It is also an objective to strip the product of stems leaves, etc. It is also an object to provide a device that is convenient to clean.

This invention is directed toward the steps including rinsing off loosely adhering debris, then placing the product in a container which has a lining specially selected for the purpose, then oscillating the container with the product inside for an appropriate number of cycles, then removing the product. After a sufficient number of oscillations, depending on the type and condition of the product, the product is removed from the container.

Access of individual members of the product to the interior lining of the product is an important parameter for successful performance of the method. Therefore, the ratio of the surface area of the product to the interior wall of container must not exceed a value depending on the product. For example, for grapes or small tomatoes. the container should not be filled more than about 25% full. Furthermore, sufficient contact of the lining and skin of the product requires that the interior of the container be elongated with the cross sectional area of the interior comparable to the cross sectional shape of the members of the product. Therefore, with appropriate end-to-end manual oscillatory motion, this shape provides a rolling motion to the members of the product with resultant rubbing of the surface of the members against the lining.

The container of this invention has a lining and design appropriately selected for the purpose. The design of the bag is such as to provide convenient loading and unloading of product to and from the interior of the bag. The preferred lining of the container is lintless terry cloth however a number of linings are effective for the purpose such as a coarse absorbent paper having good wet strength. Another requirement is that the interior lining of the bag be conveniently accessible for occasional cleaning. Another advantageous feature is that the bag have dimensions of cross sectional area that is adaptable to the size of the members of the product being cleaned.

In one embodiment, access to the lining is provided by a construction in which a zipper extends from one end to the other end of the bag. Closable openings at each end of the bag for filling and emptying. the product members are provided for quickly loading or unloading product. In another embodiment, an elastic section in the bag provides that the bag will be contracted to accommodate smaller members of product such as grapes or cherries but is expanded to accommodate larger product members such as apples or pears.

In another embodiment a rectangular wire frame has one end with hooks that may be secured inside and to one end of the lining and a handle outside the other open end of the lining. When it is required to clean the lining, the wire frame is withdrawn from the bag thereby withdrawing the lining from the inside of the outer bag and turning the bag inside out for convenient cleaning. After cleaning, the end of the frame with one end of the lining attached is "poked" back into the outer bag cover to resume the cleaning and polishing operation. The open end of the bag is provided with ties for attachment to the rail.

BRIEF DESCRIPTION OF THE DRAWINGS

FIG. 14 is a back side view.

FIG. 15 is a top view.

FIG. 16 is a front side view.

FIG. 17 is right side view.

FIG. 18 is a bottom view.

DETAILED DESCRIPTION OF THE INVENTION

The following paragraphs present several variations and modifications of the invention, including what I presently believe to be the best mode for carrying out the invention.

Figure 1:
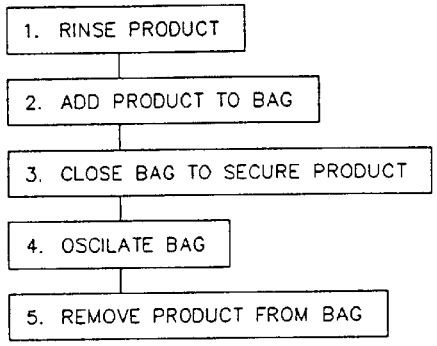
FIG. 1 is a flow diagram of the method of the invention.

Turning now to a discussion of the drawings, FIG. 1 is a flow diagram illustrating the steps in performing the method of this invention.

In step 1, the members of product are rinsed to remove loose debris.

In step 2, the product is placed in an elongated bag-like container having an appropriate liner. The liner is preferably an absorbent material and is abrasive to a degree that is dependent on the product. Liners that have performed satisfactorily include terry cloth, sponge, fabric having a nap or bristles that confers a brush-like texture to the surface. The bag is preferably filled to not more than 25% capacity.

In step 3, the product is secured inside of the cleaning bag by closing the opening or openings of the bag with the closures provided.

In step 4, the bag is oscillated in a direction parallel to the long dimension of the bag. Approximately ten or so oscillations are recommended for most situations.

In step 5, the bag closures are opened and contents are removed from the bag. A slit extends about an inch from the lip of the opening toward the other end of the bag allowing the user to pour the product from the bag into a serving container without touching the fruit with his hands.

Figure 2:
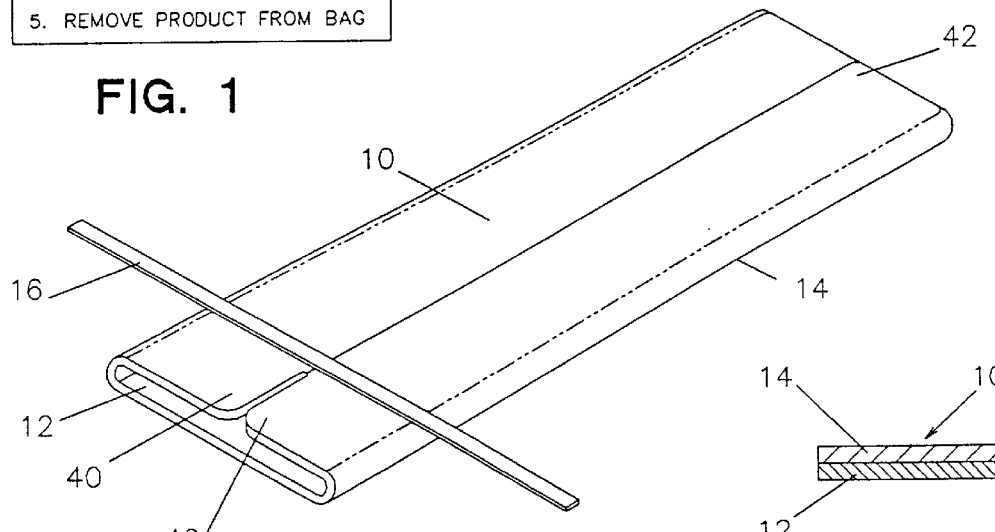
FIG. 2 is an embodiment of the apparatus of the invention.
Figure 3:
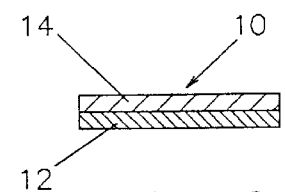
FIG. 3 is a sectional view of the apparatus of FIG. 2.

FIG. 2 shows a bag 10 generally having an elongated shape for practicing the invention. A cross section of the bag 10 is shown in FIG. 3. The bag includes an interior lining 12 that is preferably lintless terry cloth or coarse absorbent paper and an exterior wrap 14 that is selected for its resistance to soiling. The exterior wrap 14 is preferably a plastic sheet, but may be made of cloth or paper. At least one end of the bag 10 is provided with a tie string 16. The open end of the bag has a slit at the opening with tabs 40. The user holds the end 42 of the bag to tip the bag 10 and empty its contents into the serving dish.

Figure 4:
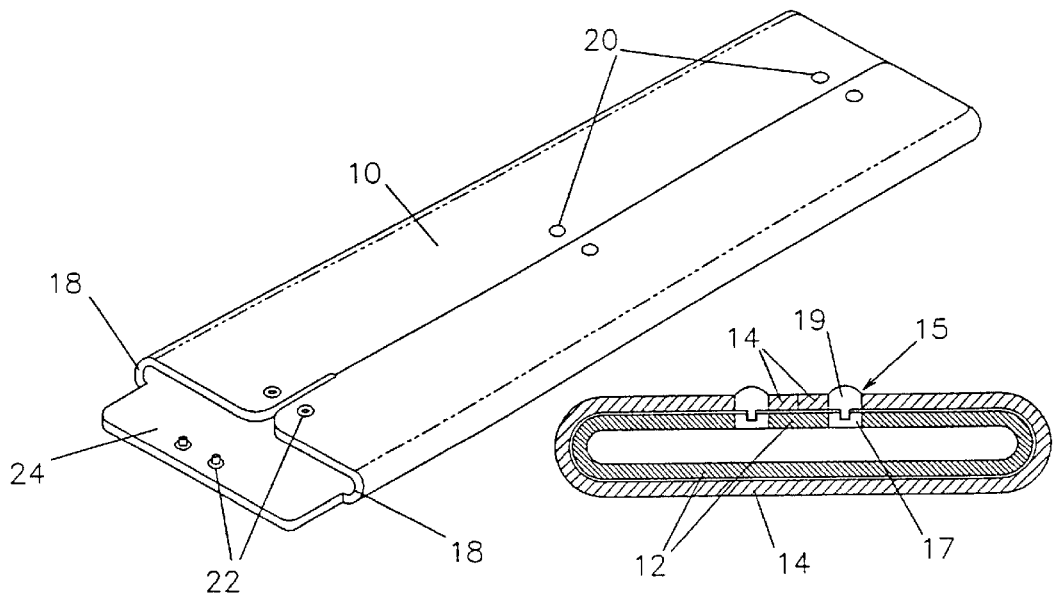
FIG. 4 shows the apparatus with snaps.
Figure 5:
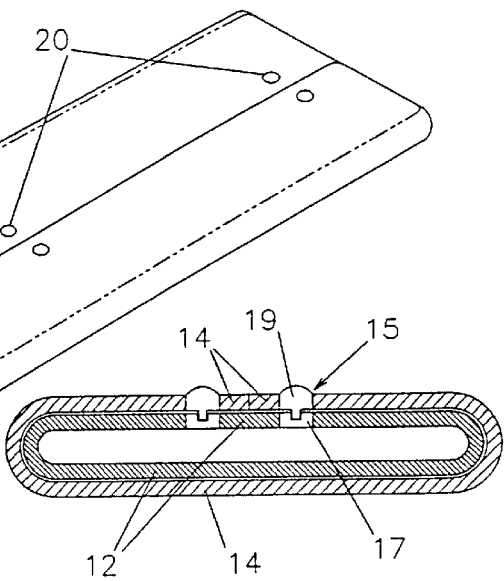
FIG. 5 is a sectional view of FIG. 4.

FIGS. 4 and 5 show a second embodiment of the apparatus. FIG. 5 is a sectional view of FIG. 4. The bag 10 includes an outside plastic wrap 14 joined to an interior terry cloth lining 12 by snaps 15. The outer wrap 14 is formed by folding opposite edges of a single sheet together and securing the folds 18 by appropriately placed snaps 15. The female part 17 of the snap 15 is secured in the cloth and the male part 19 is secured in the outer wrap 14 as shown in FIG. 5. The end snaps 22 serve to close the end flap 24 for loading and unloading product.

Figures 6, 7:
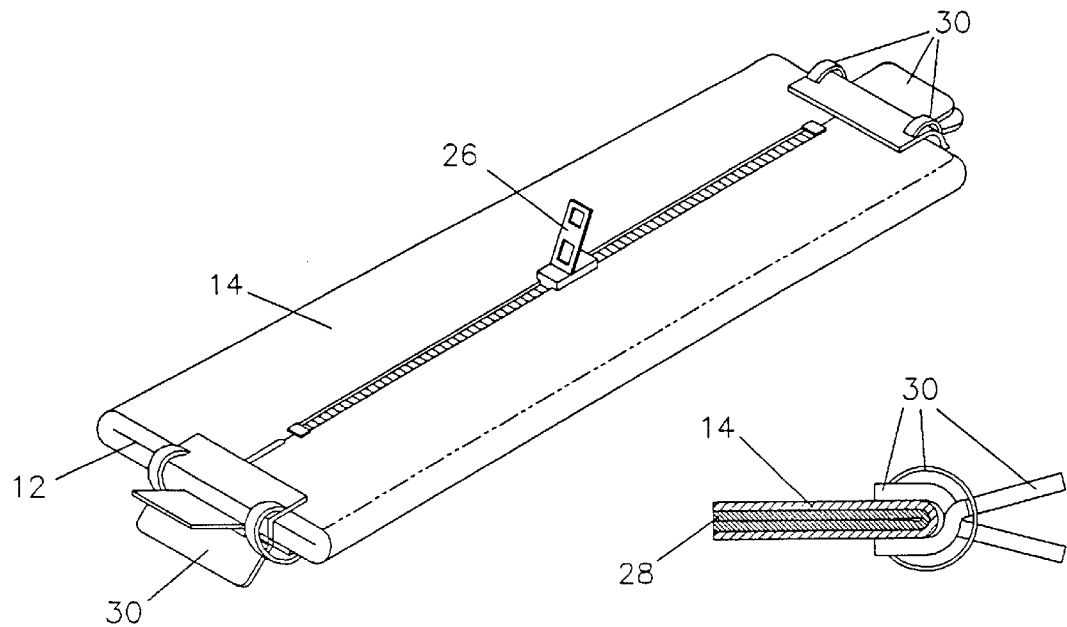
FIG. 6 shows the apparatus with zipper closure.
FIG. 7 is a sectional view of FIG. 6.

FIG. 6 shows an embodiment including a zipper 26 in the outer wrap permitting removal of a disposable paper lining 28. The paper lining (which could be disposable paper) is shown in FIG. 7 temporarily secured in its position inside the wrap 14 by clamps 30.

The paper used in these embodiments is preferably a coarse absorbent paper with good wet strength. For these purposes, SINGLE FOLD TOWEL 755 or ROLL TOWEL 1275 sold by the Kraft Co. is preferred.

Figure 8:
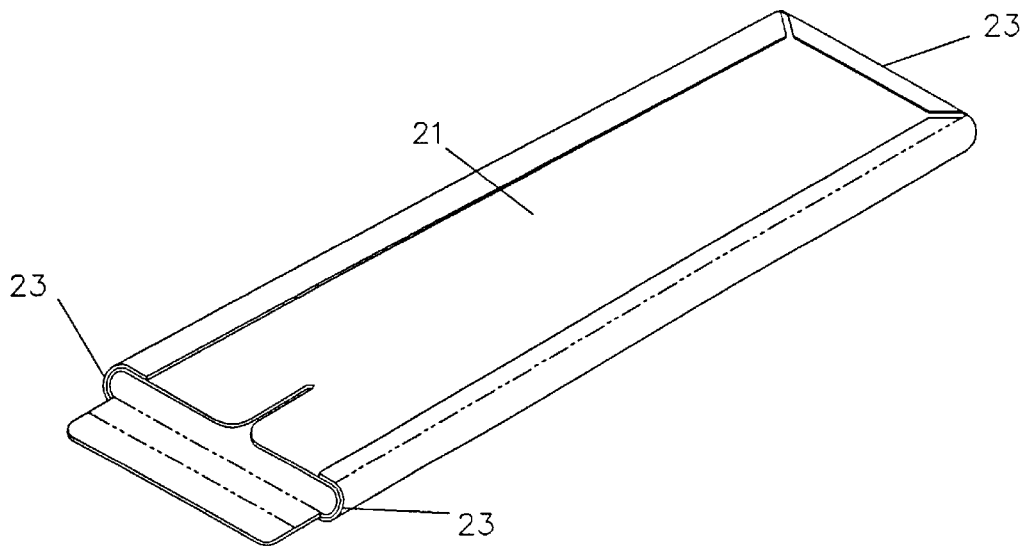
FIG. 8 is another embodiment of the apparatus.

FIG. 8 shows an embodiment which uses a heavy disposable paper lining (not shown) enclosed within a thin plastic or paper cover 21. In FIG. 8, the cover 21 is shown folded around the edges 23.

Figure 9:
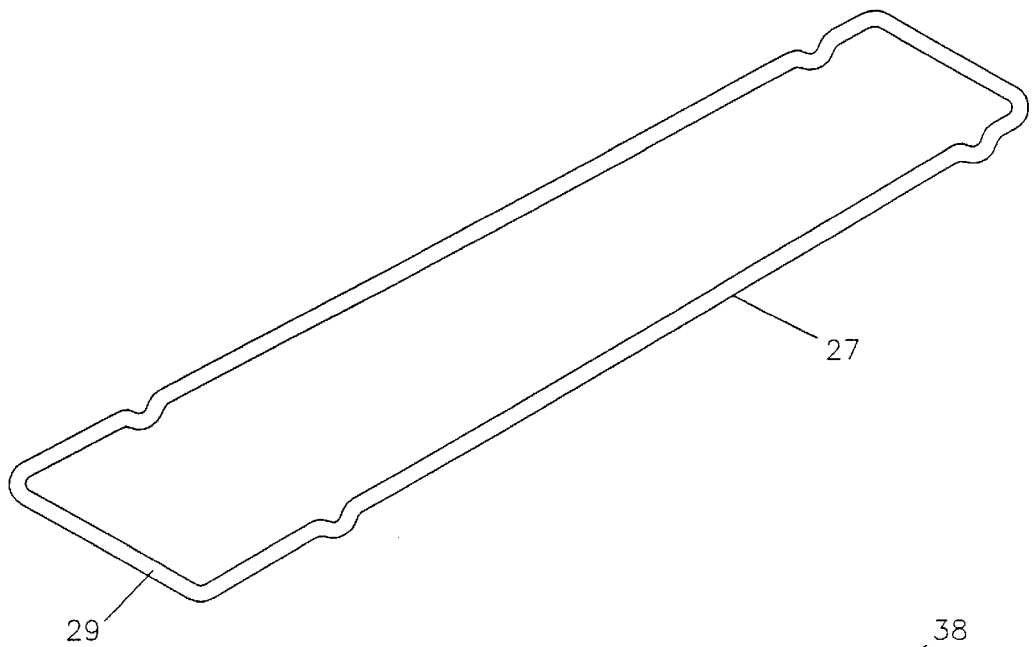
FIG. 9A shows a wire frame for oscillating the bag.
FIG. 9B shows the wire frame of FIG. 9B with bag attached.
Figure 9:
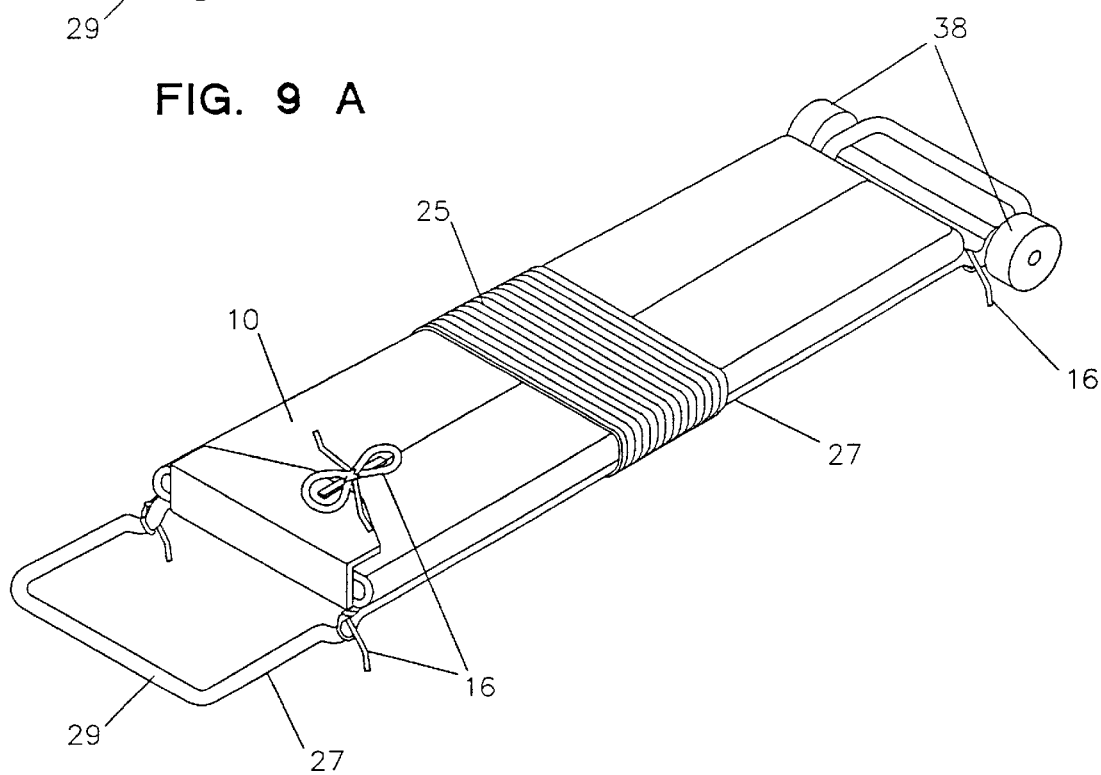

FIG. 9A and B shows an embodiment for practicing the invention by a handicapped person having one hand. FIG. 9A shows a frame 27 having a handle 29 on one end. A pair of wheels 38 are shown on the other end in FIG. 9B. The bag is secured to the frame by an elastic band 25, as shown in FIG. 9B. The bag 10 is secured to the frame 27 enabling the user to grasp the handle 29 and roll the bag 10 back and forth to agitate the fruit.

FIG. 10A is another embodiment showing a wire frame 32 inserted through the opening 34 and into the interior and secured to the far end 36 of the bag 10. As shown in FIG. 10B, when it is required to clean the inside of the bag 10, the wire frame 32 is withdrawn thereby pulling the lining and turning the lining inside out for easy access.

FIG. 10C shows that, when product is placed in the bag, the springiness of the wire frame tends to draw the liner around the product thereby augmenting the polishing action of the lining against the product as the bag is oscillated from end to end.

Figure 10:
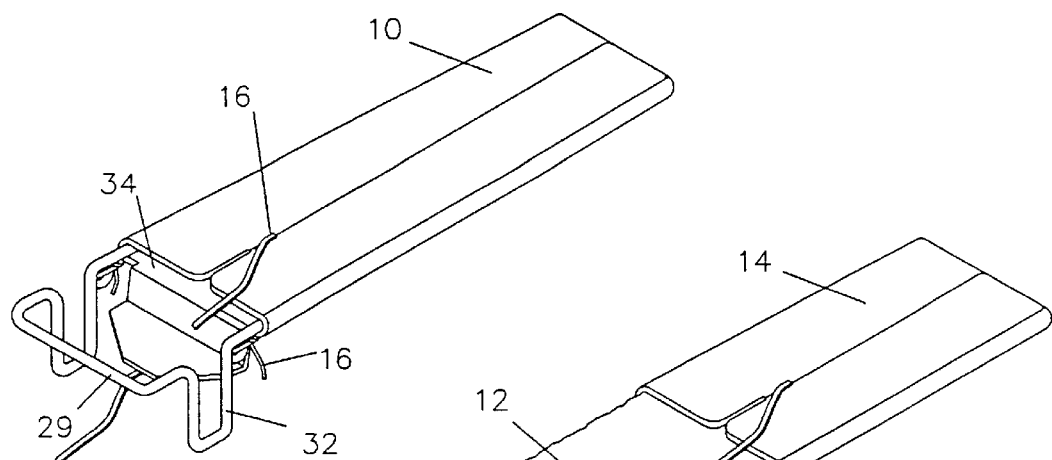
FIG. 10A, 10B and 10C show the bag with a wire frame.
Figure 10:
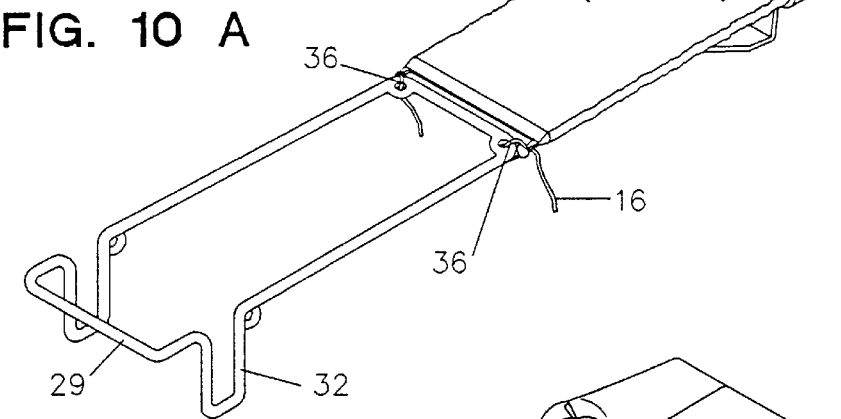
Figure 10:
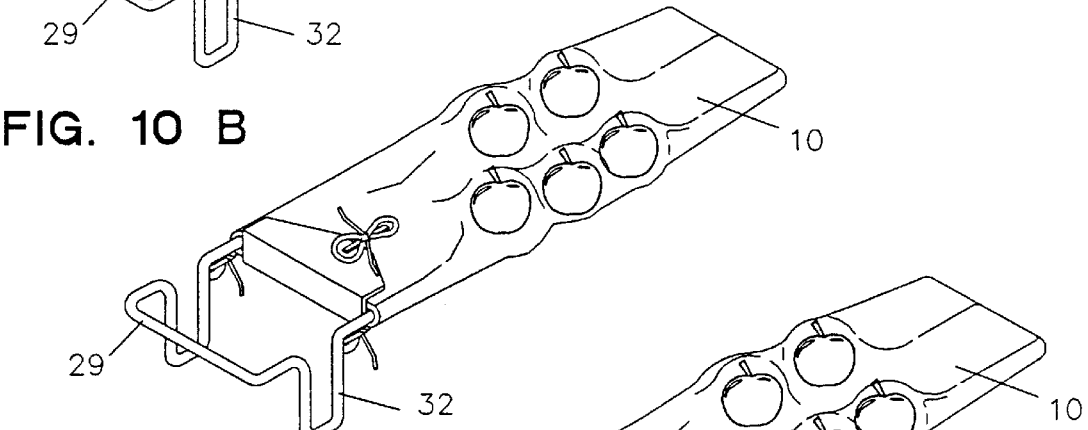
Figure 11:
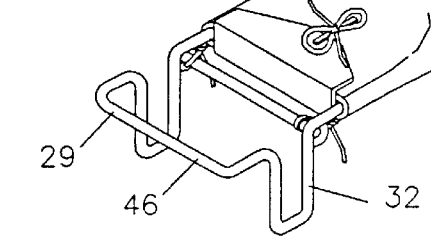
FIG. 11 shows a detail drawing of the bag of FIGS. 10 A–C.

FIG. 11 shows a wire frame similar to the frame in FIGS. 10 A–C with the addition of a cross member 46 so that tie strings 48 my be fastened to the cross member 46 close to the opening to secure the bag to the frame.

Figure 12:
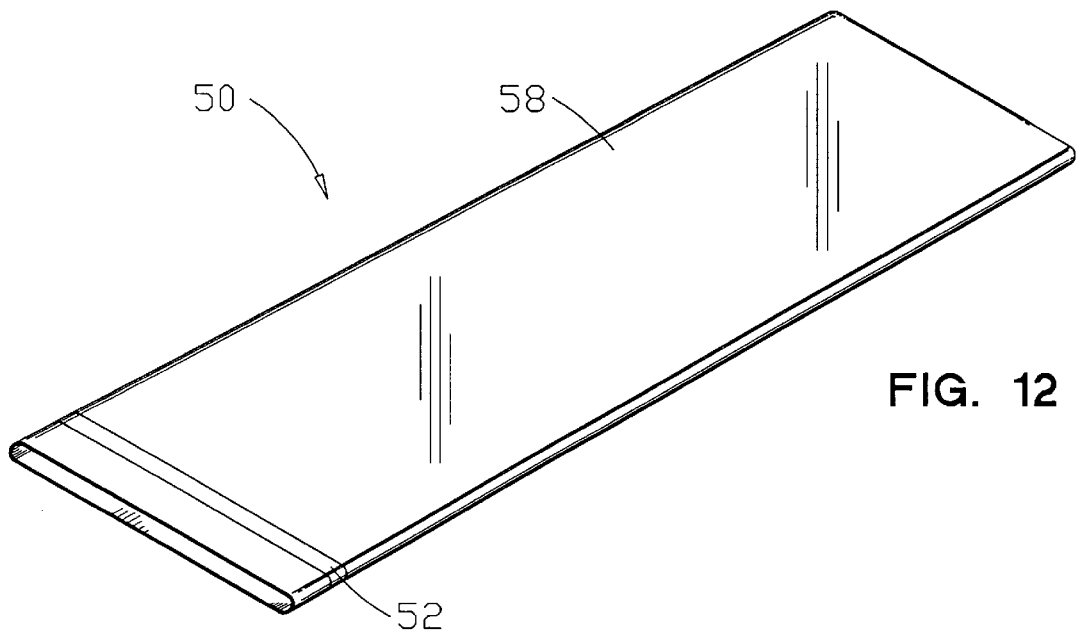
FIG. 12 is a top perspective view of an alternate embodiment of the invention.
Figure 13:
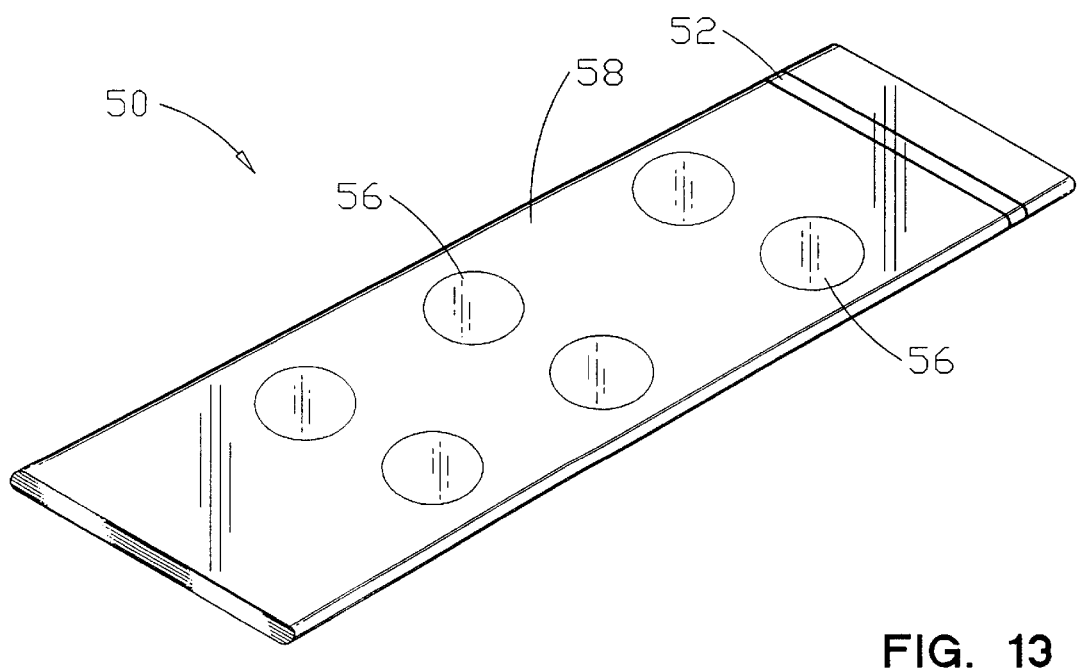
FIG. 13 is a bottom perspective view of the alternate embodiment.

FIG. 12 is a top perspective view, FIG. 13 a bottom perspective view, FIG. 14 a back view, FIG. 15 a top view, FIG. 16 a front view, FIG. 17 a right side view, and FIG. 18 a bottom view of an alternate embodiment 50 of the invention. In this embodiment 50, the pouch 50 has a closure 52 which is formed of interlocking tongues 54 (shown in detail in FIG. 19). This closure 52 forms a water-tight seal so that while the user is cleaning the products in the fruit cleaner 50 neither water nor debris will exit the pouch 50. During the cleaning process, the user may look through any of the clear window or patch 56 to determine when the product is clean. In order to form the clear windows 56, the outer bag 58 is formed of a clear material and the inner liner 60 is omitted at the window 56 locations. Alternately, a clear window 56 may be inserted into an opening formed in the outer bag 58 and the inner liner 60. This means that the user does not need to open and reopen the pouch 50 to determine when the cleaning process is complete.

Figure 19:
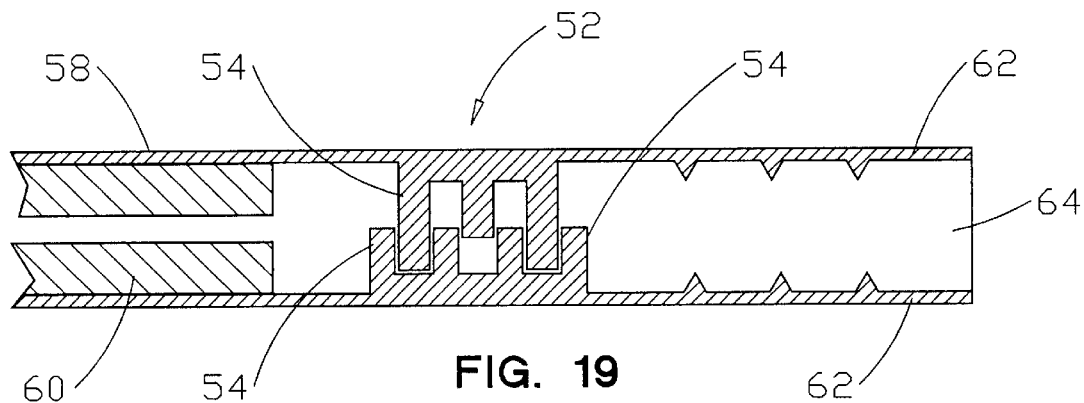
FIG. 19 is an enlarged cross-sectional view of the closure.

FIG. 19 is an enlarged cross-sectional view of the closure 52 of the alternate embodiment 50. A number of semi-rigid, linear projections 54 extend inward around the periphery of the mouth of the pouch. Optimally, the projections 54 are formed of a somewhat flexible plastic material, however, other resilient material may also be used. When pressed together, these projections 54 interlock forming a water-tight barrier. In order to separate the projections 54, the user grasps the edges 62 of the mouth 64 of the pouch 50 and pulls outward, thereby releasing the engagement between the projections 54.

Figure 20:
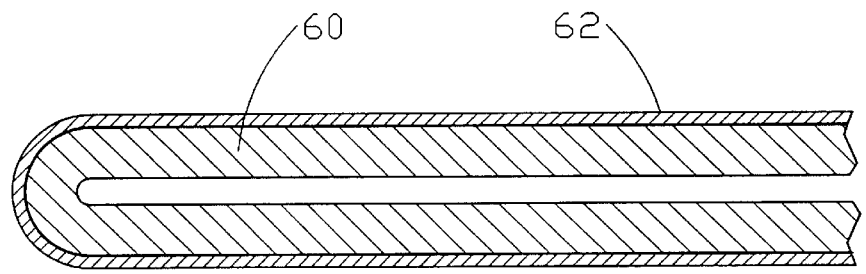
FIG. 20 is an enlarged cross-sectional view of the base.
Figure 21:
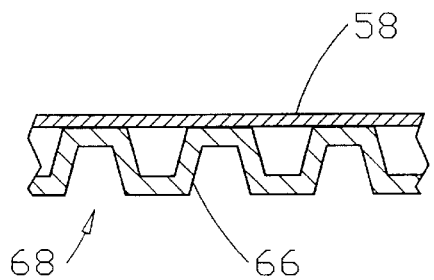
FIG. 21 is an enlarged cross-sectional view of an alternate material.
Figure 22:
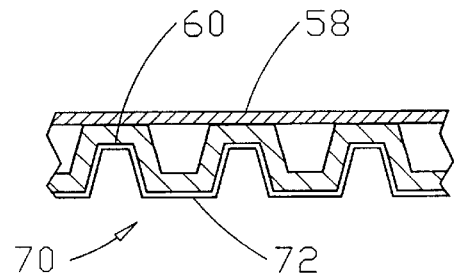
FIG. 22 is an enlarged cross-sectional view of a second alternate material.

FIG. 20 is an enlarged cross-sectional view of the base of the fruit cleaner 50. As in previous embodiments, the outer bag 58 is a plastic film, or other relatively durable material. The inner liner 60 is a paper or terry material. FIG. 21 is an enlarged cross-sectional view of an alternate material 68. The inner liner 60 of this embodiment has a rough surface 66 which provides additional surface area of the material 60 to absorb water, thereby absorbing more water more quickly as well as providing projections which may aid during the cleaning process. The present embodiment has an egg-crate type pattern, however, corrugations or other relief patterns may also be used. FIG. 22 is an enlarged cross-sectional view of a second alternate material 70. In addition to the outer bag 58 and the inner liner 60, a third layer is added to the material described in FIG. 21 The third layer is or has cleansing material 72. This may be a mild detergent for washing purposes, or it may be an antibacterial agent for killing microorganisms. The layers of any of these material may be laminated together.

In the foregoing paragraphs, embodiments have been disclosed which meet the objects of the invention. Other modifications may be suggested by reading the claims and studying the drawings. The scope of the invention should, therefore, be determined by the following claims and their legal equivalents.

I claim:

1. An apparatus for cleaning and polishing products, including vegetables and fruits, said apparatus comprising:
   an elongated outer bag having at least one opening,
   an inner liner within said outer bag, said inner liner have an egg-crate shaped relief pattern,
   and means for dosing and securing said opening.

2. The apparatus of claim 1 wherein said inner liner is permanently fixed to the interior of said outer bag.

3. The apparatus of claim 1 wherein said inner liner is removable from said outer bag.

4. The apparatus of claim 3 wherein said outer bag has two ends, said opening being intermediate said ends, said means for securing said opening allowing said inner liner to be inserted into and removed from said outer bag through said opening.

5. The apparatus of claim 1 wherein said inner liner is made from a material selected from the group of materials consisting of terry cloth, napped fabric, bristled fabric, sponge, plastic sheet and paper.

6. The apparatus of claim 1 wherein said outer bag is made from a material selected from the group consisting of cloth, paper and plastic.

7. The apparatus of claim 1 wherein said means for closing and securing said opening is selected from the group that consists of tie strings, snaps, zippers, interlocking projections, and clamps.

8. The apparatus of claim 1 wherein said outer bag is made of an elastic material that allows said bag to expand when said product is placed in said bag.

9. The apparatus of claim 1 further comprising a frame adapted for supporting said outer bag, said frame having a handle on one end adapted for being grasped by a user and means for attaching said outer bag to said frame.

10. The apparatus of claim 9 further comprising wheels secured to said frame, said wheels being adapted for supporting said frame on a horizontal support surface.

11. The apparatus of claim 1 further comprising at least one viewing port, thereby allowing a user to view the product being cleaned.

12. The apparatus of claim 11 wherein said viewing port comprises a transparent window through said inner liner and said outer bag.

13. The apparatus of claim 1 wherein an inside surface of said inner liner has a cleansing material for aiding in cleaning the product.

14. An apparatus for cleaning and polishing products, including vegetables and fruits, said apparatus comprising:
   an outer bag having at least one opening,
   an inner liner within said outer bag,
   means for closing and securing said opening,
   and at least one viewing port allowing a user to view the product being cleaned, said viewing port being created by forming a hole through said inner liner.

15. The apparatus of claim 14 wherein said at least one viewing port is a plurality of viewing ports.

16. The apparatus of claim 14 wherein said viewing port is a transparent window through said inner liner and said outer bag.

17. An apparatus for cleaning and polishing products, including vegetables and fruits, said apparatus comprising:

an outer bag having at least one opening, an inner liner within said outer bag, means for closing and securing said opening, and at least one viewing port allowing a user to view the product being cleaned, wherein said outer bag is transparent and wherein said viewing port is a hole through said inner liner.

18. The apparatus of claim 17 wherein said at least one viewing port is a plurality of viewing ports.

19. The apparatus of claim 17 wherein said viewing port is a transparent window through said inner liner and said outer bag.

* * * * *